(12) United States Patent
Spitz et al.

(10) Patent No.: US 12,314,981 B2
(45) Date of Patent: *May 27, 2025

(54) DYNAMIC BINDING OF VIDEO CONTENT

(71) Applicant: AiBUY Holdco, Inc., Plano, TX (US)

(72) Inventors: Robert K. Spitz, Nashua, NH (US); Todd Downing, Irving, TX (US); Christian Briggs, Austin, TX (US)

(73) Assignee: AiBUY Holdco, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,409

(22) Filed: Aug. 18, 2023

(65) Prior Publication Data

US 2024/0232947 A1    Jul. 11, 2024

Related U.S. Application Data

(63) Continuation of application No. 16/727,521, filed on Dec. 26, 2019, now Pat. No. 11,763,348, which is a
(Continued)

(51) Int. Cl.
*G06Q 30/02* (2023.01)
*G06Q 30/0241* (2023.01)
(Continued)

(52) U.S. Cl.
CPC ..... *G06Q 30/0269* (2013.01); *G06Q 30/0277* (2013.01); *H04N 21/2542* (2013.01); *H04N 21/25866* (2013.01); *H04N 21/4126* (2013.01); *H04N 21/4316* (2013.01); *H04N 21/435* (2013.01); *H04N 21/4725* (2013.01); *H04N 21/478* (2013.01); *H04N 21/47815* (2013.01); *H04N 21/812* (2013.01);
(Continued)

(58) Field of Classification Search
CPC .......... G06Q 30/0269; G06Q 30/0277; H04N 21/2542; H04N 21/25866; H04N 21/4126; H04N 21/435; H04N 21/4725; H04N 21/478; H04N 21/47815; H04N 21/8126; H04N 21/8133; H04N 21/8545; H04N 21/8583
See application file for complete search history.

(56) References Cited

U.S. PATENT DOCUMENTS

2007/0250901 A1*  10/2007  McIntire .......... H04N 21/47815
                                                          348/E7.071
2009/0276805 A1*  11/2009  Andrews, II ......... H04N 21/435
                                                                725/38
(Continued)

*Primary Examiner* — Chenea Davis
(74) *Attorney, Agent, or Firm* — COOLEY LLP

(57) ABSTRACT

A method of dynamically binding supplemental content to video content includes receiving the video content at a device and identifying at least one value related to one or more products or services, where the at least one value is associated with the video content. The method also includes obtaining the supplemental content based on the at least one value, where the supplemental content provides additional information about the one or more products or services. In addition, the method includes dynamically binding the supplemental content to the video content and positioning the supplemental content in association with the video content using a supplemental interactive display.

20 Claims, 11 Drawing Sheets

Related U.S. Application Data continuation of application No. 15/845,763, filed on Dec. 18, 2017, now Pat. No. 10,559,010, which is a continuation of application No. 14/484,065, filed on Sep. 11, 2014, now Pat. No. 9,875,489.

(60) Provisional application No. 61/883,809, filed on Sep. 27, 2013, provisional application No. 61/876,647, filed on Sep. 11, 2013, provisional application No. 61/876,668, filed on Sep. 11, 2013.

(51) Int. Cl.
*G06Q 30/0251* (2023.01)
*H04N 21/254* (2011.01)
*H04N 21/258* (2011.01)
*H04N 21/41* (2011.01)
*H04N 21/431* (2011.01)
*H04N 21/435* (2011.01)
*H04N 21/4725* (2011.01)
*H04N 21/478* (2011.01)
*H04N 21/81* (2011.01)
*H04N 21/8545* (2011.01)
*H04N 21/858* (2011.01)

(52) U.S. Cl.
CPC ..... *H04N 21/8126* (2013.01); *H04N 21/8133* (2013.01); *H04N 21/8545* (2013.01); *H04N 21/8583* (2013.01)

(56) References Cited

U.S. PATENT DOCUMENTS

| | | | | |
|---|---|---|---|---|
| 2010/0114983 | A1* | 5/2010 | Robert | H04L 67/06 707/E17.005 |
| 2011/0247042 | A1* | 10/2011 | Mallinson | H04N 21/2225 725/86 |
| 2011/0276157 | A1* | 11/2011 | Wang | H04L 67/568 700/94 |
| 2012/0227074 | A1* | 9/2012 | Hill | H04N 21/4725 725/61 |
| 2013/0014155 | A1* | 1/2013 | Clarke | G11B 27/105 725/32 |
| 2013/0051554 | A1* | 2/2013 | Braness | H04N 21/47202 725/93 |
| 2013/0054757 | A1* | 2/2013 | Spitz | G06Q 30/0251 709/219 |

* cited by examiner

DYNAMIC BINDING OF VIDEO CONTENT

CROSS-REFERENCE TO RELATED APPLICATIONS AND PRIORITY CLAIM

This disclosure is a continuation of U.S. patent application Ser. No. 16/727,521, filed on Dec. 26, 2019, and entitled "DYNAMIC BINDING OF VIDEO CONTENT," which is a Continuation of U.S. patent application Ser. No. 15/845, 763 filed on Dec. 18, 2017 and entitled "DYNAMIC BINDING OF VIDEO CONTENT," which is a Continuation of U.S. patent application Ser. No. 14/484,065 filed on Sep. 11, 2014 and entitled "DYNAMIC BINDING OF VIDEO CONTENT" which in turn claims priority to and benefit of each of the following provisional patent applications:
- U.S. Provisional Patent Application No. 61/876,668 filed on Sep. 11, 2013 and entitled "DYNAMIC BINDING OF INTELLIGENT INTERNET OBJECTS;"
- U.S. Provisional Patent Application No. 61/876,647 filed on Sep. 11, 2013 and entitled "AD-HOC DYNAMIC BINDING OF INTELLIGENT INTERNET OBJECTS;" and
- U.S. Provisional Patent Application No. 61/883,809 filed on Sep. 27, 2013 and entitled "AD-HOC DYNAMIC BINDING";

each of the aforementioned patent applications are hereby incorporated by reference in their entirety.

TECHNICAL FIELD

This disclosure is directed generally to software and more specifically to dynamic binding of video content.

BACKGROUND

It is well-known that videos may be broadcast or provided through a number of media, such as television, the Internet, DVDs, and the like. To finance such video broadcasts, commercial advertisements are often placed in the videos. Commercials, however, require that a video be momentarily interrupted while the commercials are displayed. Not only is this annoying to viewers, but digital video recorders (DVRs) allow video programs to be pre-recorded. When the video programs are viewed, DVRs allow the viewers to fast-forward through commercials, thereby defeating the effectiveness and value of the commercials. When commercials are de-valued, costs are not adequately covered, and broadcast service quality suffers as a result. In many cases, costs are made up by charging viewers for video services.

In many conventional systems, a variety of different content has little or no interactivity. This includes both videos and images. For example, when viewing video, different objects in the video are often merely part of a single video stream that is inseparable with respect to the different objects. Static advertisements near the video stream related to the video are not very compelling as they are separated from the video in such a way that a user is not encouraged to interact with the static advertisement.

SUMMARY

This disclosure provides dynamic binding of video content.

In a first embodiment, a method of dynamically binding supplemental content to video content includes receiving the video content at a device and identifying at least one value related to one or more products or services, where the at least one value is associated with the video content. The method also includes obtaining the supplemental content based on the at least one value, where the supplemental content provides additional information about the one or more products or services. In addition, the method includes dynamically binding the supplemental content to the video content and positioning the supplemental content in association with the video content using a supplemental interactive display.

In a second embodiment, an apparatus includes at least one memory and at least one processing device. The at least one memory is configured to receive and store video content. The at least one processing device is configured to identify at least one value related to one or more products or services, where the at least one value is associated with the video content. The at least one processing device is also configured to obtain supplemental content based on the at least one value, where the supplemental content provides additional information about the one or more products or services. In addition, the at least one processing device is configured to dynamically bind the supplemental content to the video content and position the supplemental content in association with the video content using a supplemental interactive display.

In a third embodiment, a non-transitory computer-readable medium includes logic stored on the computer-readable medium. The logic is configured when executed to cause at least one processing device to receive video content and identify at least one value related to one or more products or services, where the at least one value is associated with the video content. The logic is also configured when executed to cause the at least one processing device to obtain supplemental content based on the at least one value, where the supplemental content provides additional information about the one or more products or services. The logic is further configured when executed to cause the at least one processing device to dynamically bind the supplemental content to the video content and position the supplemental content in association with the video content using a supplemental interactive display.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 13, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged system.

Figure 1:
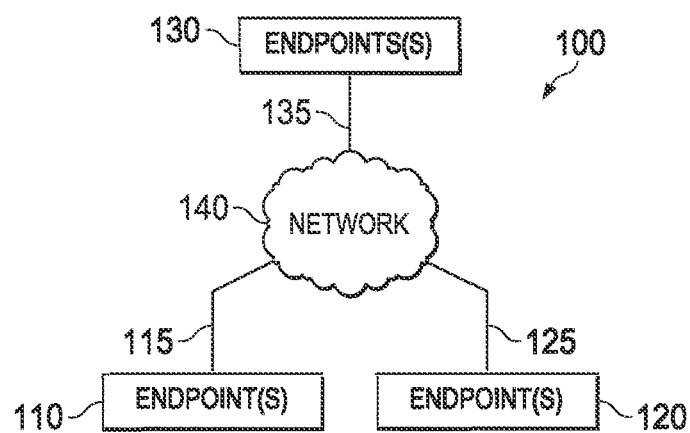
FIG. 1 illustrates an example communication system that can be utilized to facilitate communication between endpoints through a communication network according to this disclosure.

FIG. 1 illustrates an example communication system 100 that can be utilized to facilitate communication between endpoints through a communication network according to this disclosure. As shown in FIG. 1, the system 100 includes various endpoints 110, 120, and 130. In this document, the term "endpoint" generally refers to any device, system, or other structure that communicates with another endpoint. Example endpoints 110, 120, and 130 include but are not limited to servers (such as application servers and enterprise servers), desktop computers, laptop computers, netbook computers, tablet computers (such as APPLE IPADs), switches, mobile phones (such as IPHONE and ANDROID-based phones), networked glasses (such as GOOGLE GLASS), networked televisions, networked disc players, components in a cloud-computing network, or any other device or component suitable for communicating information to and from a communication network. Endpoints 110, 120, and 130 may support Internet Protocol (IP) or any other suitable communication protocol(s), Endpoints 110, 120, and 130 may additionally include medium access control (MAC) and physical layer (PHY) interfaces, such as those that conform to the IEEE 701.11 standard. An endpoint 110, 120, and 130 can have a device identifier, such as a MAC address, and may have a device profile that describes the endpoint.

A communication network 140 facilitates communications between the endpoints 110, 120, and 130. Various links 115, 125, and 135 couple the endpoints 110, 120, and 130 to the communication network 140. The communication network 140 and associated links 115, 125, and 135 may include but are not limited to a public or private data network, a telephony network, a local area network (LAN), a metropolitan area network (MAN), a wide area network (WAN), a wireline or wireless network (such as GSM, CDMA, LTE, WIMAX, 5G, or the like), a local/regional/global communication network, portions of a cloud-computing network, a communication bus for components in a system, an optical network, a satellite network, an enterprise intranet, or any other communication links or combinations of the preceding. In particular embodiments, portions of the links 115, 125, 135 or the communication network 140 may be on or form a part of the Internet.

Although the endpoints 110, 120, and 130 generally appear as being in a single location in FIG. 1, various endpoints may be geographically dispersed, such as in cloud computing scenarios. Also, each endpoint could represent a fixed or mobile device. When the endpoints 110, 120, and 130 communicate with one another, any of a variety of security schemes may be utilized. As an example, in particular embodiments, the endpoints 110 and 120 may represent clients, and the endpoint(s) 130 may represent one or more servers in a client-server architecture. The server(s) may host a website, and the website may have a registration process whereby a user establishes a username and password to authenticate or log into the website. The website may additionally utilize a web application for any particular application or feature that may need to be served up to the website for use by the user. Additionally, in particular configurations, the communication between the endpoints 110 and 120 may be facilitated using a communication path through the endpoint 130.

Various embodiments described in this patent document may benefit from and/or utilize SMART CONTAINER technology from CINSAY, INC., which is briefly described below and is described more fully in U.S. Pat. No. 8,769,053 (which is hereby incorporated by reference in its entirety). This technology provides an innovative way for merchants to reach their customers online. In the traditional online sales model, merchants need to create search or display ads that show up when online consumers visit search engine sites or various web properties. If a consumer sees an interesting ad related to a product or service, the consumer needs to leave his or her current activity and visit some other web destination to discover more information or make an online purchase. Consumers have specific online behavior patterns. If consumers are actively shopping, the traditional multistep model is workable. The traditional advertising sales model requires that a consumer stop what he or she is doing and visit some other online destination. However, if consumers are on social sites interacting with friends, reading the news, playing games, or engaging in other online activities, they are much less likely to leave their current activities to visit some external Internet destinations.

The SMART CONTAINER model brings product information or a store to the consumer. The SMART CONTAINER code/technology virally syndicates across the web, for example, using components described with reference to FIGS. 1 and 5 or using other components. It is ideal for those types of destinations that online consumers tend to frequent, such as social networks and blogs. Regardless, if the SMART CONTAINER code is located on a web page, a blog article, a social network page or wall, or a mobile device, a consumer can complete a transaction right there with no need to be diverted to some external destination.

SMART CONTAINER objects are intelligent Internet objects that virally syndicate and propagate across the web and other connected networks and mobile devices. They can be configured in a variety of ways to address the entire value chain of online marketing and shopping. This includes impressions, clicks, lead generation, and performing e-commerce transactions. A modern shopping experience works best when interactive media is used. One of the most appealing forms of media for sales and shopping is video. It allows a much more lifelike representation than text or static pictures. It also creates a much richer product browsing or shopping experience.

SMART CONTAINER code is normally configured with a video player window, a selection of products or services being offered, and a variety of related video clips. This collection of video clips allows a consumer to learn more about the products or services being offered. The consumer can select any of these offered items to get more details, all enclosed within the SMART CONTAINER technology.

The offered items (products or services) may be items being advertised or sold. Depending on the type, the SMART CONTAINER code may allow a consumer to request to be contacted, or even purchase the object, right there. The consumer need not leave his or her current activity or web page. Offered items could also include or be associated with discounts or coupons. They may even be an opportunity to donate to a charity or political campaign. Of course, sometimes it does make sense to visit another Internet designation, and if appropriate the consumer can certainly be linked there as well.

Because the SMART CONTAINER code handles all the complexity, it can turn the simplest website into an instant e-commerce store. This enables anyone to transact online without having to deal with the complexity of setting up an e-commerce site. For merchants with an e-commerce site, it readily enables a much richer shopping experience. For the creative hobbyist or local band, it lets them readily sell directly to interested consumers. To support and promote them, supplemental items in the SMART CONTAINER code called ON-DEMAND merchandise can be offered. Merchants can custom design a selection of apparel with their art and graphics to be sold along with their own creations. ON-DEMAND fulfillment dynamically produces and ships their custom apparel for them, eliminating the need to manage inventory and providing their online customers with a richer line of products. Of course, because their instant e-commerce stores are based on SMART CONTAINER objects, it can also propagate out onto all forms of viral syndication methods as well.

The SMART CONTAINER code is also auto-customizing according to particular configurations. If a device is a traditional personal computer (PC) or laptop, it will render using optimal technology, which for this purpose could represent FLASH. On mobile devices such as IPHONEs, IPADs, or ANDROID phones, this means HTML5 or a native interactive app will likely get used. The items in the SMART CONTAINER code also know about each other according to particular configurations. When a video is playing, a container can update product and service objects being shown that correspond with the particular sequence in a video segment. It allows a "mini QVC" shopping channel to be created and syndicated across the Internet. Beyond device type, there are other dimensions of customization. Smaller devices and some environments such as social sites restrict window sizes, so the SMART CONTAINER code adapts. In addition, it may be appropriate to provide different content based on geolocation, so the SMART CONTAINER code can customize for these, as well.

The SMART CONTAINER code virally syndicates across the Internet following the more popular network paths. SMART CONTAINER objects can be hosted on traditional web pages or blogs, contained in emails, operate on mobile devices, or propagate social networks. Because the SMART CONTAINER code is flexible, it can also be set up in the form factor of a display ad unit and distributed via ad servers on display advertising networks. When the code exists on social networks like FACEBOOK, it can ride the wave of user "likes." For example, if a woman shopper likes some great shoes shown in a SMART CONTAINER object interface, the SMART CONTAINER object can propagate directly to their "wall." Now all of her friends see the SMART CONTAINER object and can view or transact right there on their own walls. Of course, if any of her friends also "like" it, the SMART CONTAINER object propagates and rides the wave further out into that branch of the social network, yielding a potential exponential growth factor. The container does not necessarily involve products like shoes. As another example, a container can support a politician running for office. His or her supporters may be passionate about a message and "like" it, again making it available to their networks. Now, similarly-minded political supporters can view those messages and, if so moved, donate to the cause. Yet another example is sports. In this case, a sports fan may wish to watch content on his or her high-definition (HD) large screen television. More and more users have interconnected devices such as ROKU and CHROMECAST devices, and the SMART CONTAINER code may be sent to such IP television boxes, as well.

When merchants launch and syndicate their SMART CONTAINER objects onto the Internet, they want to know how their campaigns are performing. SMART CONTAINER objects report back status on events and transactions of interest such as impressions, video views, clicks, leads, and sales. All such events/transactions can be sent back as events occur, providing details on how they are doing. Because the containers are smart, they can be instructed to change behavior, offer different clips, update products, or to end when it is time to stop a marketing or sales campaign.

Another form of tracking relates to how the SMART CONTAINER code is propagated. A merchant may wish to use affiliates to help syndicate them and pay them a percentage based on the transactions resulting from their work. SMART CONTAINER objects can be tagged with affiliate tracking identifiers, allowing status reports and transactions from container instances or their descendants to be properly filtered. Another tracking usage may be for a politician to assign affiliate codes to his or her supporters and be able to measure whose efforts result in the most new supporters.

SMART CONTAINER objects are designed to be highly scalable according to particular configurations. Rather than burden a single website with massive traffic (which would result from a traditional model of bringing all consumers to a store), SMART CONTAINER code operates in a distributed manner. For example, the SMART CONTAINER code can execute where it is located, such as on a blog, a social network, or a mobile device. SMART CONTAINER objects fetch their instructions when started and then gather their product items and video streams from a worldwide distributed content delivery network. This results in a highly scalable architecture, allowing millions of concurrent consumers.

By bringing the store to the customer, the SMART CONTAINER code enables many new ways for merchants to connect with their consumers without disrupting the consumers' web activities. The end result is to connect the consumers directly with the merchants, eliminating the middleman and promoting a much more natural shopping experience.

Figure 12:
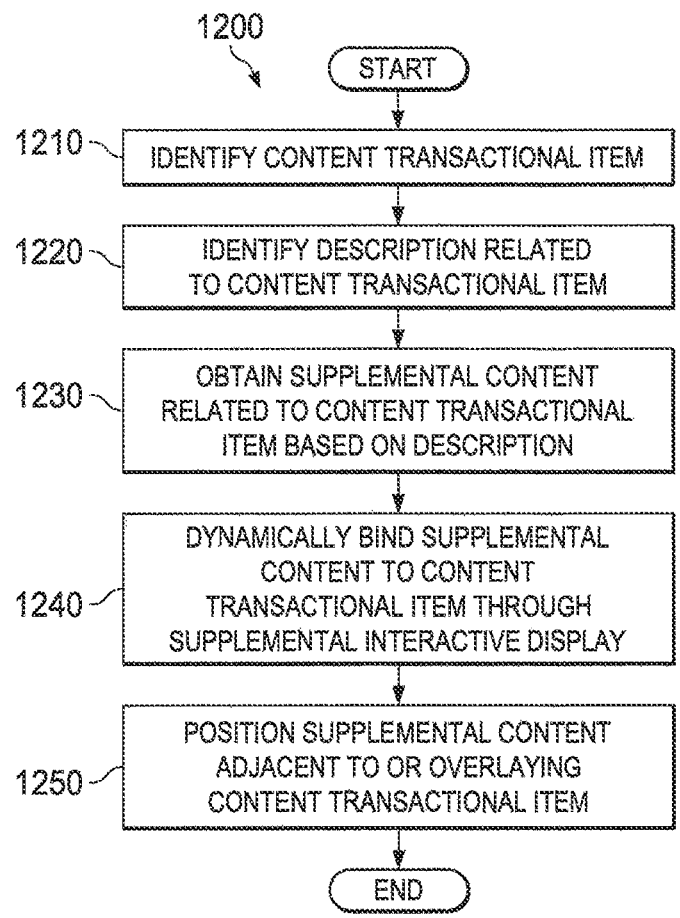
FIG. 12 illustrates an example process for dynamically binding supplemental content to a content transactional item according to this disclosure.

The functionality of the above description may avail from any suitable components, such as those described in FIGS. 1 and 12 or other suitable components. The code itself may be written in any suitable format, including but not limited to Java, C++, C-sharp, HTML, HTML5, JAVA SCRIPT, PYTHON, RUBY, and the like.

There exists a variety of media content (video and audio) in the world that is independent, existing separate from any special containers such as the SMART CONTAINER code. Certain embodiments of this disclosure seek to harness the power of such content by dynamically binding supplemental content to the underlying base content. As a simple example, a video may be streamed from a content server, such as is provided by one of many video streaming services. According to certain embodiments of this disclosure, supplemental content is added dynamically to such content. In one or more embodiments, "dynamically" may also be referred to as "real-time." The disclosure below, among other things, describes the addition of such supplemental content and the determination of which supplemental content to provide. This can be done based on the base content, a user profile, a device profile, or other factors.

FIGS. 2A through 2E illustrate example dynamic bindings of supplemental content to base content according to this disclosure. As seen in FIGS. 2A through 2E, a base content 200 is generally shown. The base content 200 represents literally any type of visual or audio content—be it a picture, a streaming video, a live stream from a remote location, real-time content from the current location of a device, a web page, or other types of visual content. The supplemental content represents additional information related to the base content and/or a user accessing the base content. In one or more embodiments, the supplemental content can override the module playing the base content and expand the functionality of the module (such as with YOUTUBE).

In some embodiments, supplemental content may include additional information, configurable controls, selectable configurations, content transactional items such as products or services, and the like. Although the displayable area for the base content 200 is generally shown as having a rectangular boundary area, the displayable area for the base content 200 may take on other shapes. Additionally, the base content 200 may be shown in (or through) a virtually limitless number of devices, from mobile phones to computers to televisions.

As examples of the above, the base content 200 may be a video streamed through a video-based provider, such as YOUTUBE, VIMEO, NETFLIX, REDBOX INSTANT or others, being viewed on a computer, a mobile device, a television screen, or any other suitable device or devices. The base content 200 may also be a real-time view of content at a current location being viewed through an electronic device such as GOOGLE GLASS or a real-time view in a mobile computing device such as a tablet or phone. In yet other configurations, the base content 200 may be an image. In still other configurations, the base content 200 may be a web page.

Figure 2A:
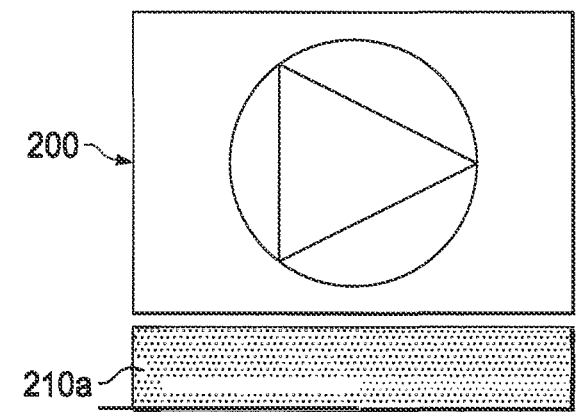
FIGS. 2A through 2E illustrate example dynamic bindings of supplemental content to base content according to this disclosure.
Figure 2B:
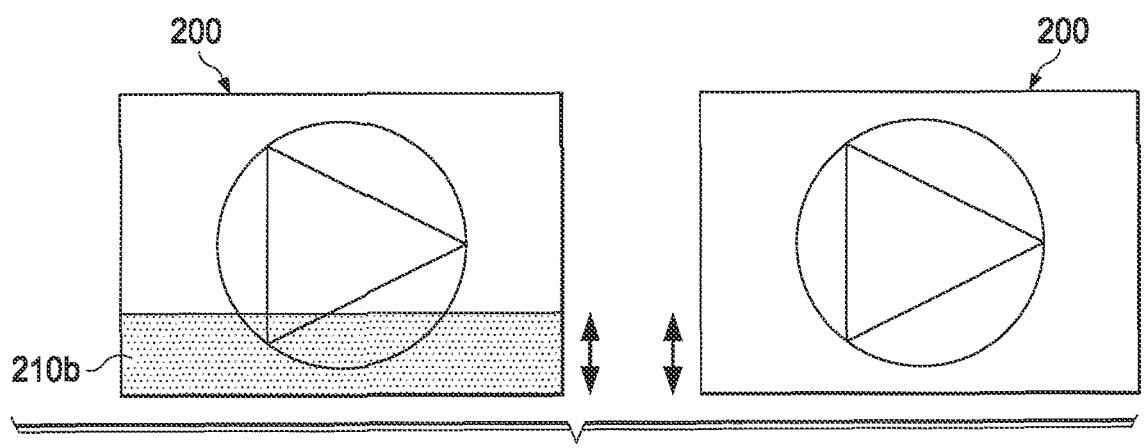

Also shown in FIGS. 2A through 2E are non-limiting examples of the supplemental content 210a-210e that are configured to dynamically bind to the base content 200. Although certain examples are provided, it should be understood that such examples are non-limiting and other configurations may be utilized as will become apparent to one of ordinary skill in the art having read this disclosure. In some configurations, the supplemental content may overlay the base content, whether partially transparent or not. Examples of supplemental content 210b and 210e overlaying the base content 200 are shown in FIG. 2B (left position) and FIG. 2E. In other configurations, the supplemental content may be positioned outside of the base content 200, such as to the left, right, top, bottom, or other positions.

Figure 2C:
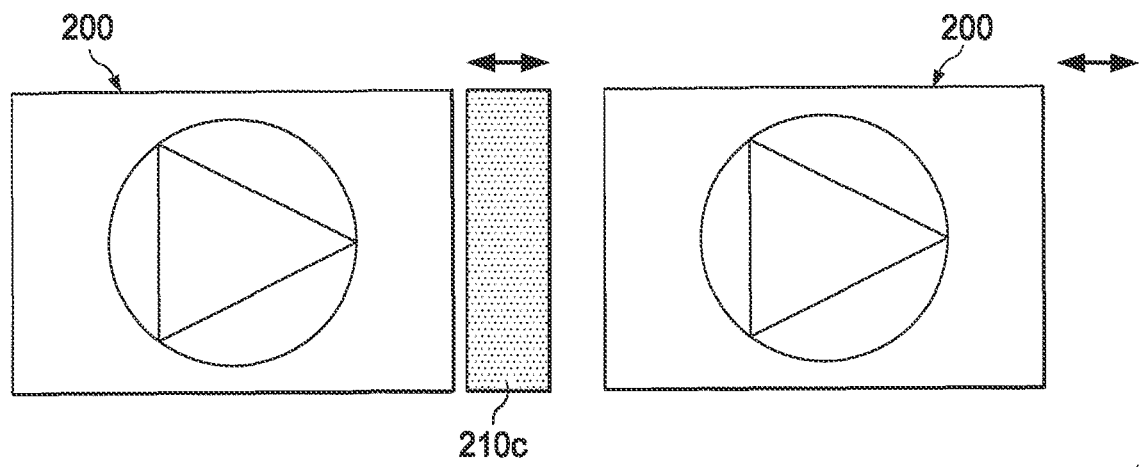
Figure 2D:
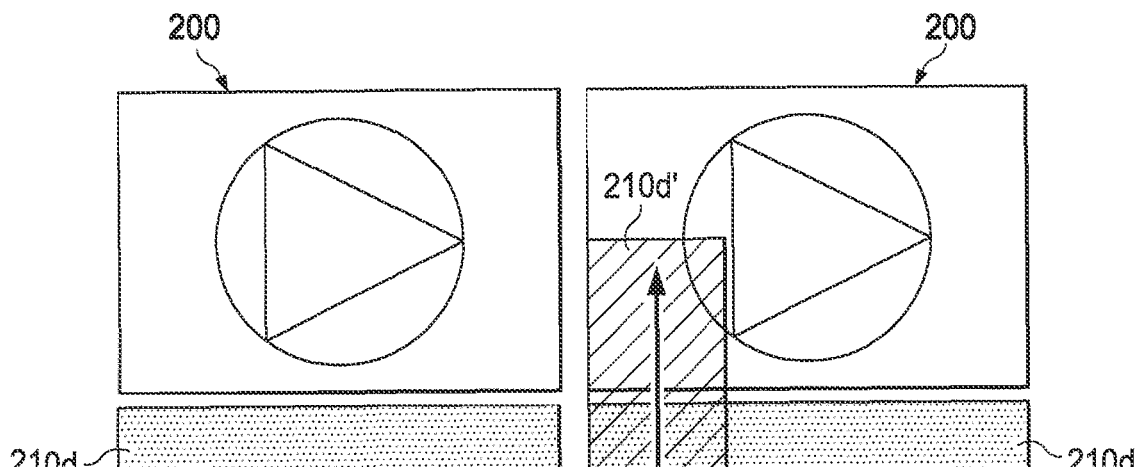

Examples of supplemental content 210a, 210c, and 210d outside of a boundary area of the base content 200 are shown in FIG. 2A, FIG. 2C (left position), and FIG. 2D.

In certain configurations, the supplemental content may be selectively displayable and/or selectively "hideable," such as due to user action or inaction. For example, in some configurations, a user interacting with a container for the base content may cause a menu with supplemental content to appear. Examples of these configurations are shown in FIGS. 2B and 2C with the double-edged arrows representing selective display-ability or selective hide-ability.

Figure 2E:
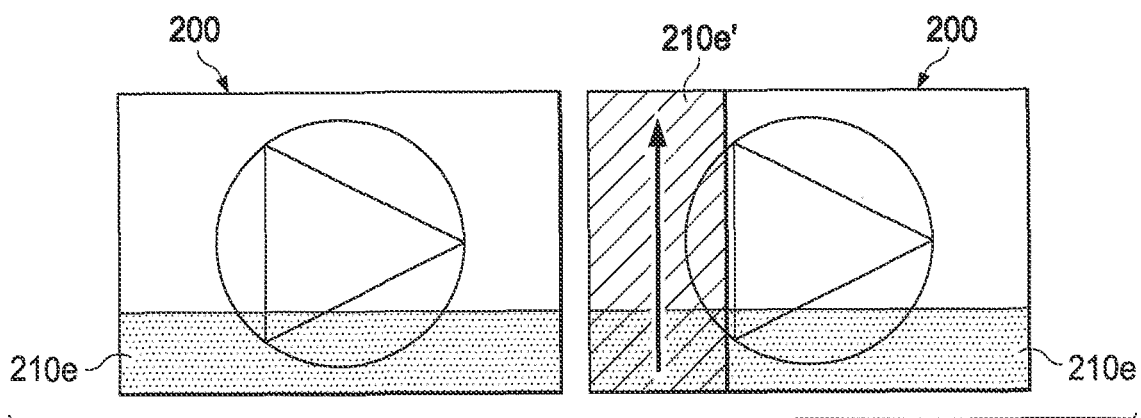

In still other configurations, the supplemental content may begin outside an area of the base content 200 and expand to cover, partially transparent or not, the base content 200. For example, as seen in FIG. 2D, the position of the supplemental content 210d on the left is just below a displayable area for the base content 200. However, in the position of the supplemental content 210d on the right (which may be the result of interactivity by a user), the supplemental content 210d expands to at least partially overlay the base content 200 (as shown by an area 210d'). A similar configuration is also shown in FIG. 2E except that the supplemental content 210e began as an overlay of the screen and an area 210e' covers an entire edge of the displayable area for the base content 200.

In particular configurations, the supplemental content is independent of the base content and is bound dynamically as the base content is displayed. For example, in particular settings, a web page may have a container (such as an embed code) that instantiates (loads or invokes) (i) the base content and (ii) the supplemental content. According to certain configurations, a call for supplemental content can be based on what is being shown in the base content, with the supplemental content specifically relating to the base content. Additionally, the supplemental content may be based on other parameters, such as a user profile or a geolocation of the user viewing the base content. As another example, in other configurations, a page analyzer can review a web page to determine locations where base content is contained and overlay or adjust such base content.

According to this specification, the concept of "binding" refers to associating supplemental content with base content, whereas "dynamic binding" refers to associating content on the fly, such as upon detection of the base content. In particular configurations, the initial association may allow the subsequent sharing of both the supplemental content and the base content together, as will be described with reference to figures below. More particularly, in certain configurations, an initial dynamic binding yields a shareable container (which may or may not be instantiated by an embed code) that, upon being shared to a new device, instantiates the underlying base content and the supplemental content. In other configurations, no such container is created, and a dynamic binding or dynamic association of the supplemental content is done for every playing of the video. In yet other configurations, supplemental content may be bound to a video, and the particular content is dynamically determined when the video is requested for playback.

A variety of technologies may be used for the above-described dynamic binding. As an example non-limiting configuration, the supplemental content may be configured as one layer in a display, where the base content is another layer. In such configurations, the layer for the supplemental content may be forward in the layers to allow an overlay as might be appropriate. In other configurations, the supplemental content may simply be provided a positioning with respect to the base content.

In particular configurations, the supplemental content can be dynamically sized based on a determined size of the base content and/or the spacing configurations for the device on which the base content and the supplemental content will be displayed. In other configurations, given a particular size for the base content, the supplemental content may use the same size for a container that requests a slightly reduced-size base content with extra room for the supplemental content. In implementing such a configuration, the technology can intercept a request for the base content and redirect such a request in order to request a container that, in turn, requests the base content and then the supplemental content. This latter configuration may be beneficial for scenarios where the supplemental content does not overlay the base content.

Figure 3A:
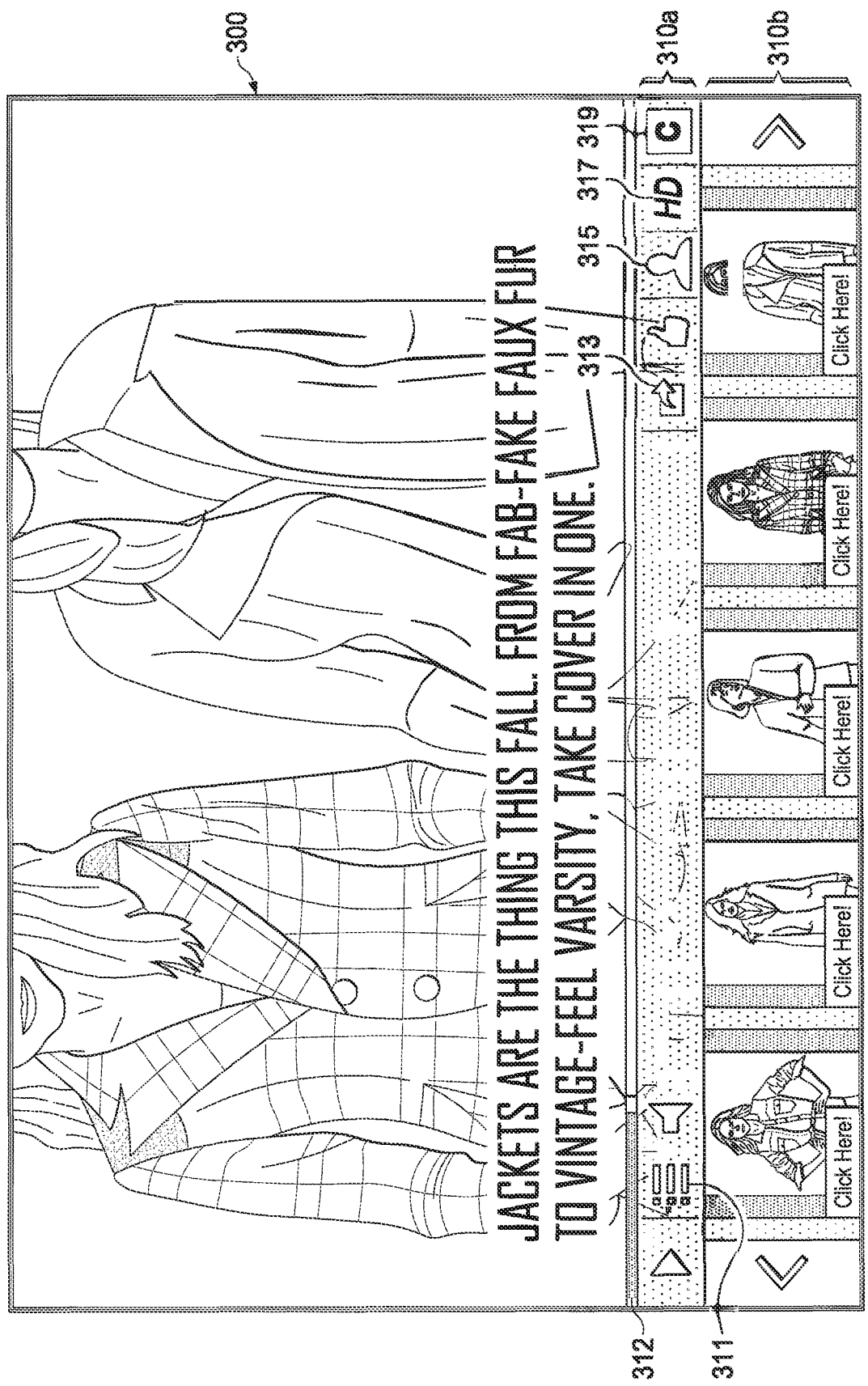
FIGS. 3A through 3C illustrate example displays that may be created with dynamic binding according to this disclosure.
Figure 3B:
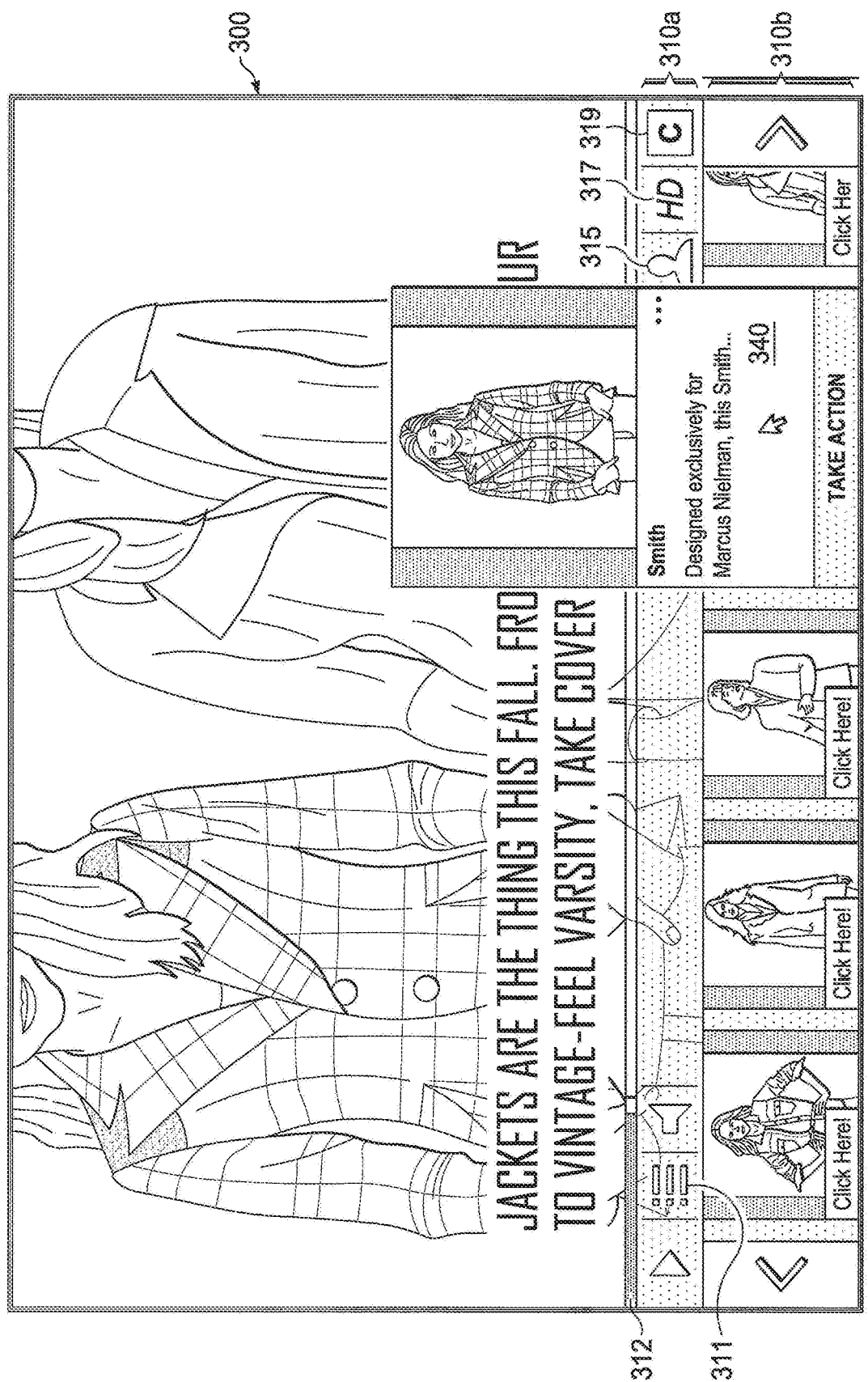
Figure 3C:
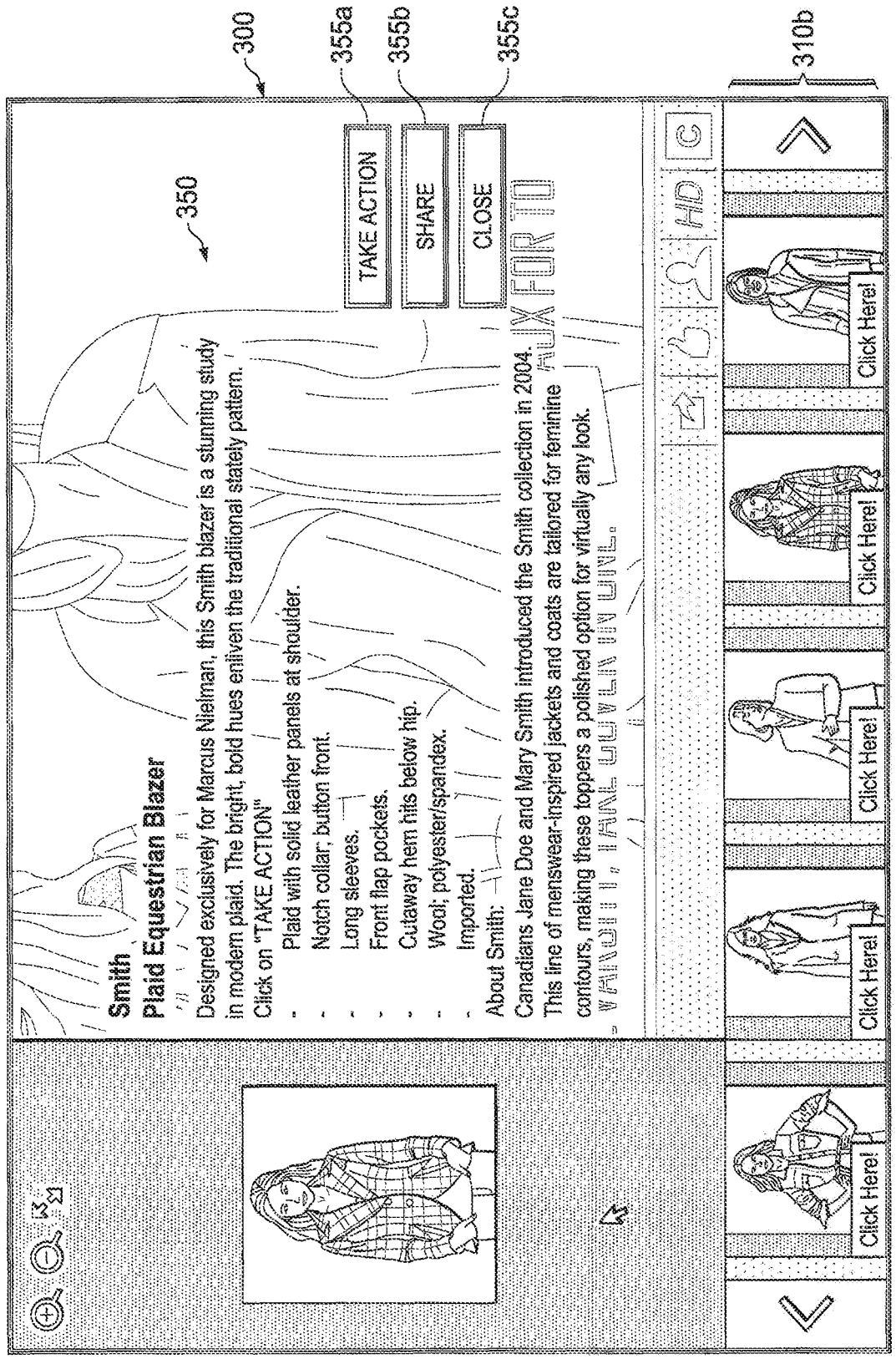

FIGS. 3A through 3C illustrate example displays that may be created with dynamic binding according to this disclosure. With reference to FIG. 3A, a base content 300 is shown. Here, the base content 300 is a video, although as noted above other types of content may also be used for the base content 300. Two types of supplemental content are shown, namely supplemental content 310*a* that initially overlays the displayable area of the base content 300 and supplemental content 310*b* that initially does not overlay the displayable area of the based content 300.

The supplemental content 310*a* is an interactive toolbar that contains a variety of options, including play and audio options 311, share options 313, account login options 315, video quality options 317, and further information options 319. The functionality of the play and audio options 311 are apparent to one of ordinary skill in the art. Also shown is a play bar 312, which is apparent to one of ordinary skill in the art. In particular configurations, the play bar 312 may replace a play bar that would otherwise co-exist for a display of the base content 300.

Upon clicking on the share options 313, a variety of other options may be provided. For example, a user may be given the opportunity to share a container of the dynamically bound content via networks such as FACEBOOK, MYSPACE, TWITTER, YAHOO, LINKEDIN, GOOGLE, or WORDPRESS. Furthermore, the user may be given the option to copy embed codes and share via email. Additionally, the user may be able to propagate the container by clicking the "like" thumb or "+1"ing on GOOGLE PLUS. The account login options 315 may allow a user to sign into a variety of networks including, for example, CINSAY, FACEBOOK, or GOOGLE. The video quality options 317 allow modification of the video, and the further information options 319 provide any of a variety of options that may be selected related to supplemental information.

The supplemental content 310*b* is shown as a product carousel that contains a plurality of interactive items corresponding to products or services shown in the video. In particular configurations, a user may interact with the displayable product carousel and purchase items or transact without leaving the displayable areas of the supplemental content 310*b* and base content 300. For example, with reference to a container (with the supplemental content and the base content 300) on a FACEBOOK wall of a friend, a user may purchase the product directly from the container for such items. In other configurations, a user may leave the container and be redirected to a website.

With reference to FIG. 3B, interactivity with a particular item 340 is shown, namely a product called SMYTHE. When a user "mouse overs" an item, eye tracking identifies a pause of the user's eyes over the item, a mouse hovers over the item, or the user "mouse clicks" on the item, it overlays as shown in FIG. 3B. In another example, a user could touch a touch screen to select an item. Further information about the product or service is shown. Additionally, when one clicks on the "TAKE ACTION" button, the user is taken to the view shown in FIG. 3C.

With reference to FIG. 3C, a user is allowed to further interact with the overlay screen, including viewing even further additional information 350. In FIG. 3C, in some embodiments, the base content 300 may be completely overlaid. In other examples, the base content 300 may be partially overlaid. In some embodiments, according to certain configurations, the user is allowed to further interact with the overlay screen by purchasing the item displayed, sharing the item displayed, and/or closing the additional information and reverting to the screen shown in FIG. 3A or 3B. In an example embodiment, the user may access these functions by clicking a "TAKE ACTION" button 355*a*, a "SHARE" button 355*b*, and/or a "CLOSE" button 355*c*.

Figure 4:
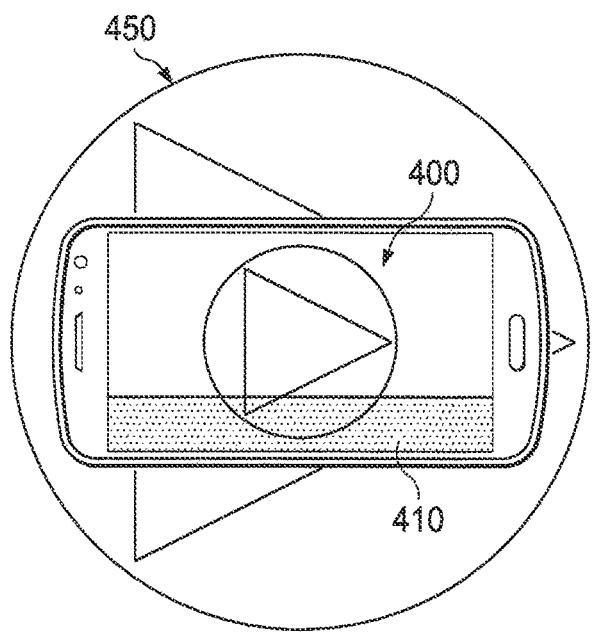
FIG. 4 illustrates another example display that may be created with dynamic binding according to this disclosure.

FIG. 4 illustrates another example display that may be created with dynamic binding according to this disclosure. In FIG. 4, a mobile phone 450 is positioned in front of an object. The object is displayed on the mobile phone 450, for example, as captured through a camera on the mobile phone. The display shown corresponds to underlying base content 400. Upon initiation of embodiments of this disclosure, supplemental content 410 can be provided on the display of the mobile phone 450.

Figure 5:
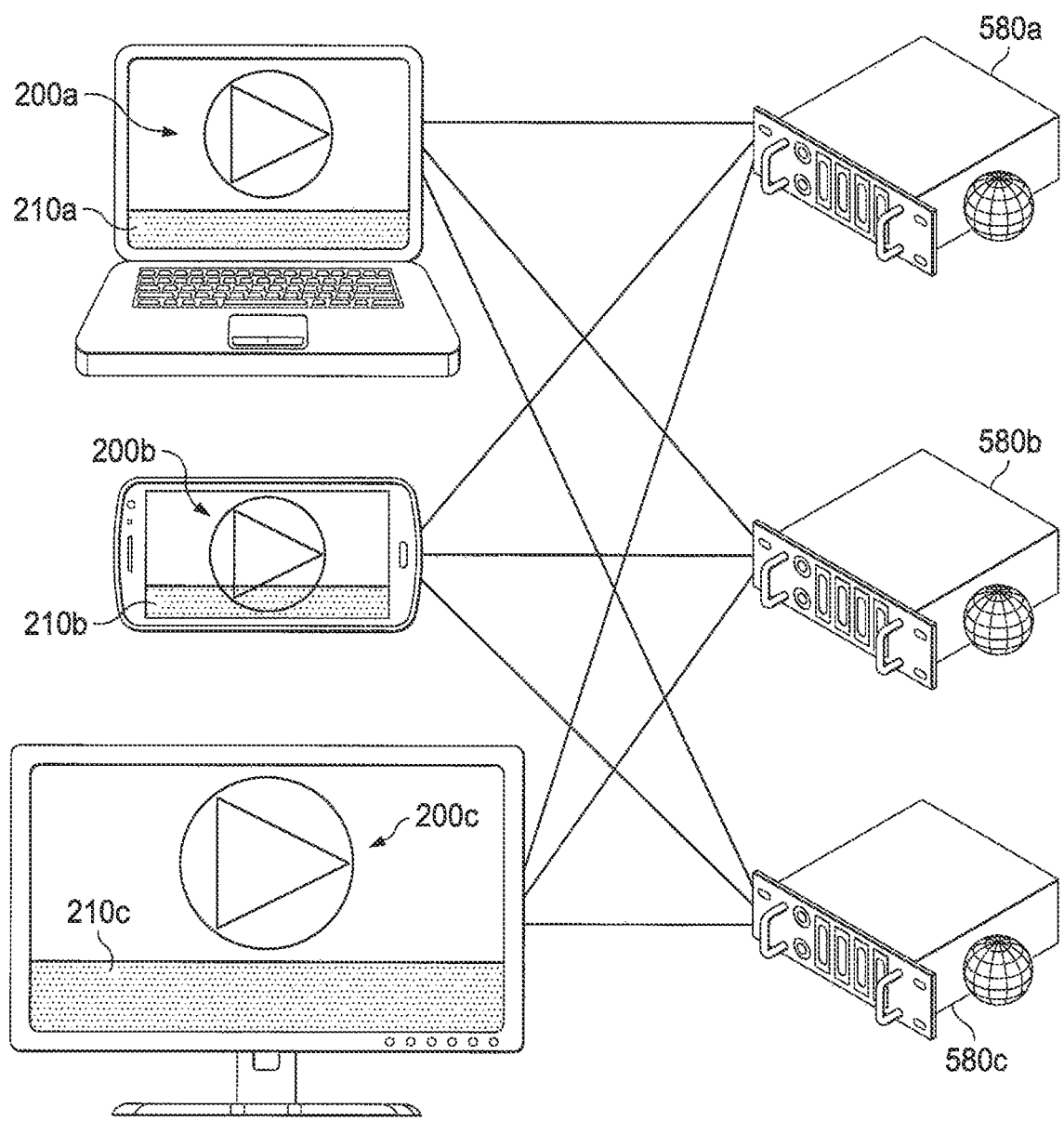
FIG. 5 illustrates example servers storing supplemental content according to this disclosure.

FIG. 5 illustrates example servers 580*a*-580*c* storing supplemental content according to this disclosure, Three devices (namely a laptop, a mobile phone, and a networked television) are respectively showing base content 200*a*-200*c*. Once the base content 200*a*-200*c* has been identified, the appropriate supplemental content 210*a*-210*c* may be bound to the base content. The supplemental content may be located on one or more of the three different servers 580*a*-580*c*.

In different embodiments, certain supplemental content or identifiers for such supplemental content can be pre-authored to correspond to the base content and used when the base content is detected. For example, when a dress in a particular movie is shown, certain pre-authored supplemental content can be displayed. Alternatively, in other configurations, just an identifier for the supplemental is pre-authored. For instance, a dress identifier may be pre-authored. When the base content is identified, the dress identifier may trigger the dynamic creation of content, which may include, among other things, a dynamically-changing price for the dress. Additionally, in particular configurations as discussed below, the supplemental content can be customized based on attributes of a user and/or a device displaying the base content and the supplemental content.

Figure 6:
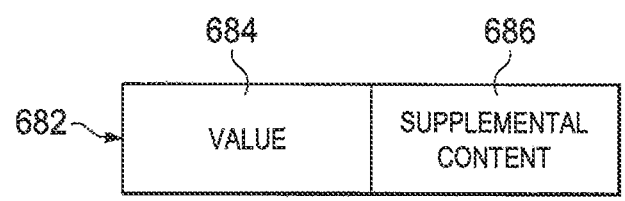
FIG. 6 illustrates an example record stored in a server such as a database server according to this disclosure.

FIG. 6 illustrates an example record 682 stored in a server such as a database server according to this disclosure. The record 682 generically shows a value 684 that corresponds to either a supplemental content 686 or an identifier (or pointer) for the supplemental content. In particular configurations, when the base content is determined, the value 684 can be looked up to determine what supplemental content 686 should be obtained. For example, the base content may correspond to a particular movie that shows a dress. When the movie and corresponding value is determined, the record for that value is looked up to yield the corresponding supplemental content (which may include items for the dress). As recognized by one of ordinary skill in the art, the record itself may simply contain pointers to obtain an actual storage of the supplemental content. In operation, the actual supplemental content and/or identifiers (or pointers) for the supplemental content that correspond to a particular value can change over time.

Figure 7:
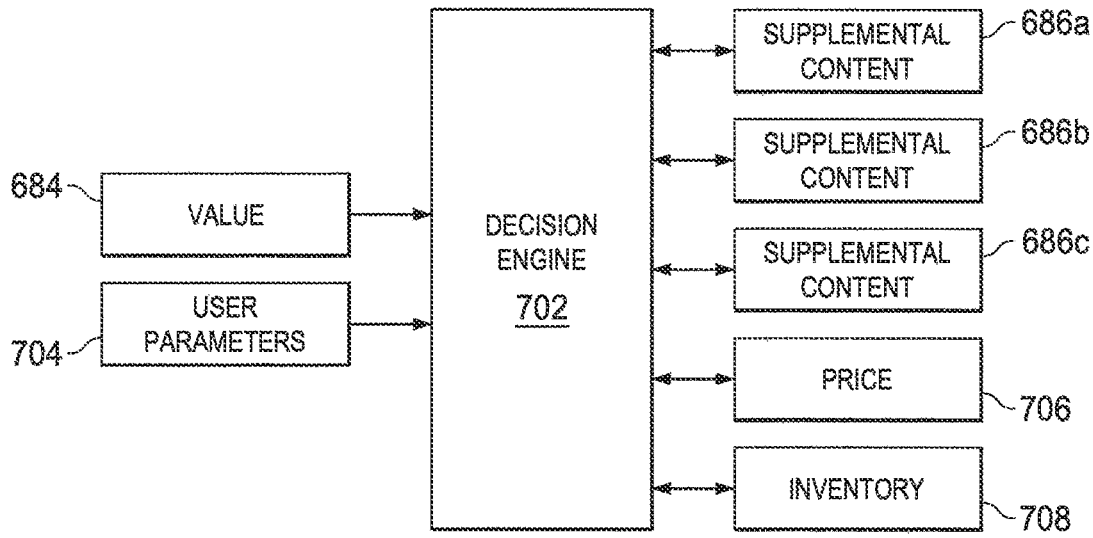
FIG. 7 illustrates an example decision engine according to this disclosure.

FIG. 7 illustrates an example decision engine 702 according to this disclosure. The decision engine 702 may exist as a logical construction (such as software) on any suitable server or computer, which may include components described with reference to FIG. 12. According to particular embodiments, the decision engine 702 receives a value 684 corresponding to base content and user parameters 704, some of which are discussed below. Based on these inputs (and other inputs according to other configurations), the decision engine 702 determines which supplemental content is to be sent for the base content.

More than one supplemental content may correspond to a value 684. For example, as shown in FIG. 7, different supplemental contents 686a-686c correspond to the value 684. Accordingly, other items such as user parameters 704 may assist the decision engine 702 in finding the optimal supplemental content to send to a user. In addition to the supplemental content, other associated parameters, such as price 706, inventory 708, and the like, for the supplemental content may also be obtained, either based on input from the record for the supplemental content or other parameters. As will be recognized by one of ordinary skill in the art, these associated parameters may dynamically change over time.

As a non-limiting example of the above, a value may have a variety of supplemental content 686a-686c. The decision engine 702, based on dynamic feedback from previous transactions (such as from other users), may determine that the supplemental content 686c should be selected because it currently has the best transactional conversion rate for users of similar demographics (such as when using a random sampling of the items 686a-686c to determine the conversion rate). The decision engine 702 may also determine, based on user parameters, that the user is entitled to a discount because either (a) the user is a member of a loyalty rewards club or (b) the user is transacting at a discount time of the day. The above is one example of the dynamic determination of the appropriate supplemental content that can be dynamically selected based on the base content and user parameters, including parameters of a particular user and statistical parameters of other users.

As referenced above, a variety of technologies may be utilized to recognize the content. In some configurations, content fingerprinting is utilized. For example, almost every piece of content has certain identifying characteristics that can be used to uniquely identify the content. As a non-limiting example, audio has unique sound wave characteristics when the audio is played. This remains true even with varying qualities of content. Examples of content fingerprinting are used by GOOGLE in their GOOGLE GOGGLES product for images, SHAZAM's audio fingerprinting, and GRACENOTES audio fingerprinting. For video fingerprinting, the fingerprint of the video may be based on just the audio feed, just the video feed, or both. Additionally, for the video fingerprinting, frames can be extracted and analyzed, where a confidence raises based on matches for multiple frames of content. Upon recognition of the fingerprint for the content, the content is identified, and appropriate supplemental information can be obtained. Yet other details surrounding content fingerprinting will become apparent to one of ordinary skill in the art after reviewing this specification.

In addition to the above content fingerprinting, other types of fingerprinting-type analysis can be done to either identify the content or enhance a confidence that the content is actually the content it is believed to be. Parameters that can be evaluated include the IP address or domain name from which the content is obtained, the encoding parameters (such as the codec and data transmission rate per second of video), the size of the content (such as if it is an image, pixel size, and image size), and specific metadata tags associated with the content. A variety of other content characteristics will become apparent to one of ordinary skill in the art after review of this disclosure.

As yet another example of content recognition, tags such as radio frequency identification (RFID) tags can be placed on objects that inform items that read such RFID tags of the identities of the objects. As an example, in a store, a mannequin wearing a particular dress may have an RFID tag that informs devices that read the tag of the identity of the item. In a similar vein, a fashion show can broadcast a signal with an identifier of the content being shown to allow devices to determine what is being shown for the appropriate obtaining of the supplemental content.

As still another example of content recognition, the tagging of geospatial coordinates can be performed. For example, the geospatial coordinates of a statue can be tagged. When a device is in proximity of the statue or has a geospatial view (such as with a camera of the device), the items corresponding to such geospatial coordinates can be recognized.

Multiple content recognition techniques may also be used at the same time. For example, the geoposition of a park is known. Additionally, it is known that the particular park item displays four different statues that play four different songs. Accordingly, the geoposition of the park along with the audio fingerprints for the particular songs known to be played in the park can yield the particular statue.

A variety of other types of content recognition technologies may also be utilized according to this disclosure to recognize, among other things, audio, pictures, and video. This disclosure is not limited to any particular technology. For example, in addition to the above recognition techniques, other techniques may involve an actual electronic reading of a tag that is placed on an object in the real world.

In addition to recognizing the content itself, supplemental content can also be customized based on characteristics of a user, a device, and/or other statistical information. Non-limiting examples include a profile that has been developed corresponding to a user (including but not limited to FACEBOOK SHADOW profiles), geographical location, IP address, any suitable device identifier (such as MAC address), items posted in a header that identify a client (such as GOOGLE CHROME browser), and time of the day. Based on such information, the supplemental content can be customized to correspond to a particular user.

Figure 8:
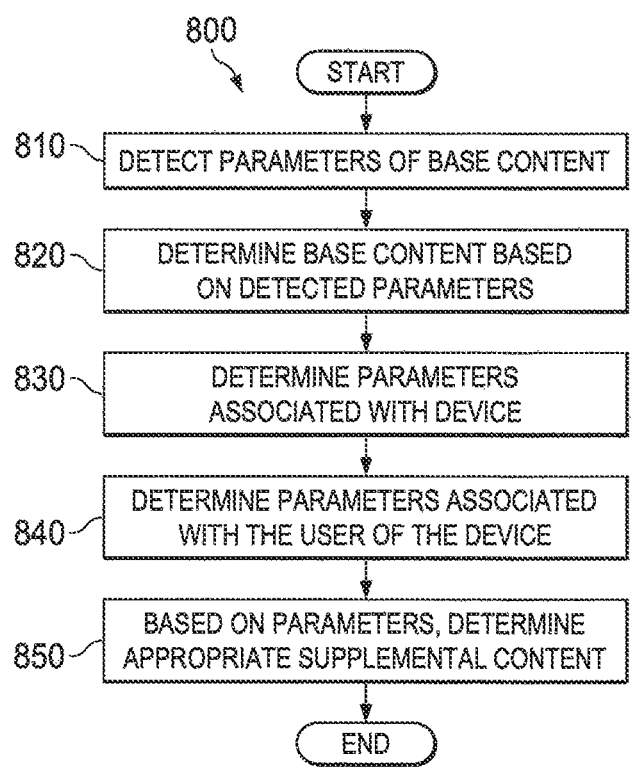
FIG. 8 illustrates an example process for ad-hoc binding of supplemental content to base content according to this disclosure.

FIG. 8 illustrates an example process 800 for ad-hoc binding of supplemental content to base content according to this disclosure. The process 800 begins by detecting parameters of the base content at step 810. This may involve detecting parameters that can be used for fingerprint detection. This may also involve detecting a tag associated with the base content. This may further involve detecting other parameters associated with the content, such as geospatial coordinates. In particular embodiments, in order to detect the parameters, an intercept process may occur where content intended to be sent to a display area is intercepted for evaluation prior to being displayed. In yet other embodiments, a capturing device that can capture audio, sound, or images may be utilized.

At step 820, the base content is determined based on the parameters. Any suitable technique may be used for this process, including the fingerprinting techniques described above or other approaches. One non-limiting example includes detecting audio in the base content, which may indicate that a particular video is being played.

At step 830, parameters associated with a device are determined. Example parameters include but are not limited to a device type, a browser type, a geolocation, bandwidth (which may include a consideration of a simultaneously streamed file for the base content), an IP address, and a time of day. In some embodiments, this step may be optional.

At step 840, parameters associated with a user of the device are determined. Example parameters include but are not limited to a profile that has been developed corresponding to a user (such as a FACEBOOK SHADOW profile). In particular embodiments, a user may have logged into a website, or a cookie corresponding to the user may be created. As other examples, a profile associated with an IP address or a MAC identifier may associate a user with a particular device. In some embodiments, this step may be optional.

At step 850, based on these parameters and the detected base content, the appropriate supplemental content is selected. In particular configurations, a decision engine such as is shown in FIG. 7 or the apparatus as shown in FIG. 12 may be utilized. A virtual limitless number of scenarios may involve the use of this process. Several non-limiting examples follow.

As a first example, a networked television may display a variety of content. Such content can be intercepted and analyzed just prior to display. In particular embodiments, this could delay the display from presenting the content for a period of a few microseconds to a few seconds or more. The analysis may be at the location of the networked television, remote from the networked television, or a combination thereof. The analysis may involve determining the content and the customization parameters for the particular user for such content. When an item, such as a dress, is shown on the networked television, supplemental content for the dress can be displayed. In particular configurations, the supplemental content could include an option to purchase the dress. Further, a pre-populated particular dress size may show up as determined by a user profile, which may include information based on previous purchases.

As another example, the display of content can be replicated from one device to another device. For instance, a television can display content. A device such as a computer, tablet, or mobile device can capture and recognize the content (using local analysis, remote analysis, or a combination thereof). Upon recognition, the content can then be replicated on the computer, tablet, or mobile device with supplemental content that is determined to be appropriate for the replicated content. As the content to be replicated may be subject to certain restrictions, any suitable authorization scheme may be utilized. If authorization cannot be obtained, an error message may be returned. However, if content can be returned, the content can be displayed on the computer, tablet, or mobile device.

Figure 9:
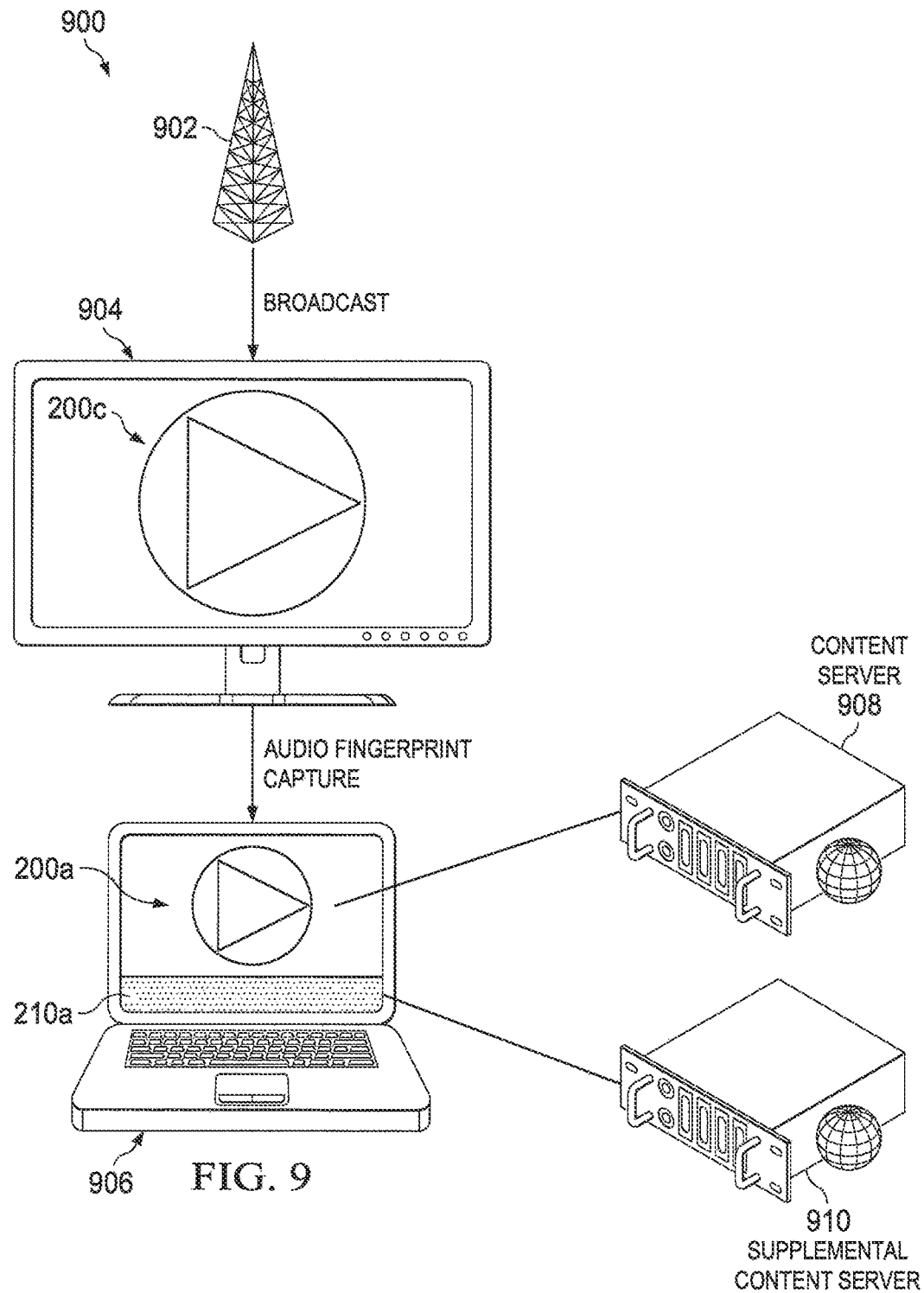
FIG. 9 illustrates an example ad-hoc binding system according to this disclosure.

FIG. 9 illustrates an example ad-hoc binding system 900 according to this disclosure. The ad-hoc binding system 900 may utilize a communication system, such as the communication system 100 shown in FIG. 1. The ad-hoc binding system 900 here includes communication architecture 902, a television 904, a computing device 906, a content server 908, and a supplemental content server 910.

In this example embodiment, the television 904 may be displaying an over-the-air broadcast or other showing of a particular movie that displays a dress. The dress catches the eye of a particular user. Accordingly, the user grabs his or her computing device 906 (such as a computer, tablet, or mobile phone) to capture the movie as base content 200. Upon detection of the movie (such as by using an audio fingerprint or other capture techniques), the detected base content 200 can be displayed (subject to authorization in certain configurations) as base content 200a along with appropriate supplemental content 210a. The base content 200a could be presented on the computing device 906 in a manner that is substantially synchronized with the presentation of the base content 200, although this need not be the case. The supplemental content 210a may include the dress along with options to purchase or information about which local stores have the dress (based on a determined geolocation of the device). The supplemental content 210a may be provided by the supplemental content server 910 while the base content 200 may be provided by the content server 908.

Moreover, notwithstanding a potential lack of a "rewind" feature for the over-the-air or other broadcast, a user can rewind the content on his or her computer, tablet, or mobile phone because the content is being streamed from the content server 908 as opposed to the communication architecture 902. This feature avoids the need for one to capture in real-time the actual moment at which something is displayed. The capture of content just after the item is displayed allows one to rewind to the moment the item is captured. Additionally, in particular embodiments, the user may be allowed to play back an uninterrupted version of the content (such as without commercial interruptions).

As a technology such as the above may be appear as disruptive (such as for a broadcaster), the playback from a content server 908 may be limited in time. Alternatively, the broadcaster may have a fee-sharing agreement for revenues that may be generated as a result of a display of information from the content server 908 or the supplemental content server 910.

As another example, a user may be located in a particular book store and see a particular book. The user can capture the book with a camera of a mobile device. With appropriate software either on the phone or at a remote location (such as when the image is uploaded to a remote server), the book is recognized using any suitable technique (such as via image or bar code recognition). Additionally, a geolocation of the mobile device may be recognized (such as by using GPS, cell-tower triangulation, or the like). Additionally, the user may be recognized as a frequent shopper of the particular book store. Having this input, the appropriate supplemental content can be generated and bound to the base content. The supplemental content, for example, may include an option to purchase from the same particular store but at a discounted price compared to the current list price.

As yet another non-limiting example, an indicator or directory may indicate that a live broadcast of a football game is being shown between the WASHINGTON REDSKINS and the DALLAS COWBOYS. A further determination may yield the likelihood that a person watching the game is a fan of quarterback Robert Griffin III ("RG3"). Accordingly, when this quarterback is shown in the live broadcast, supplemental content may show an RG3 jersey for sale.

Figure 13:
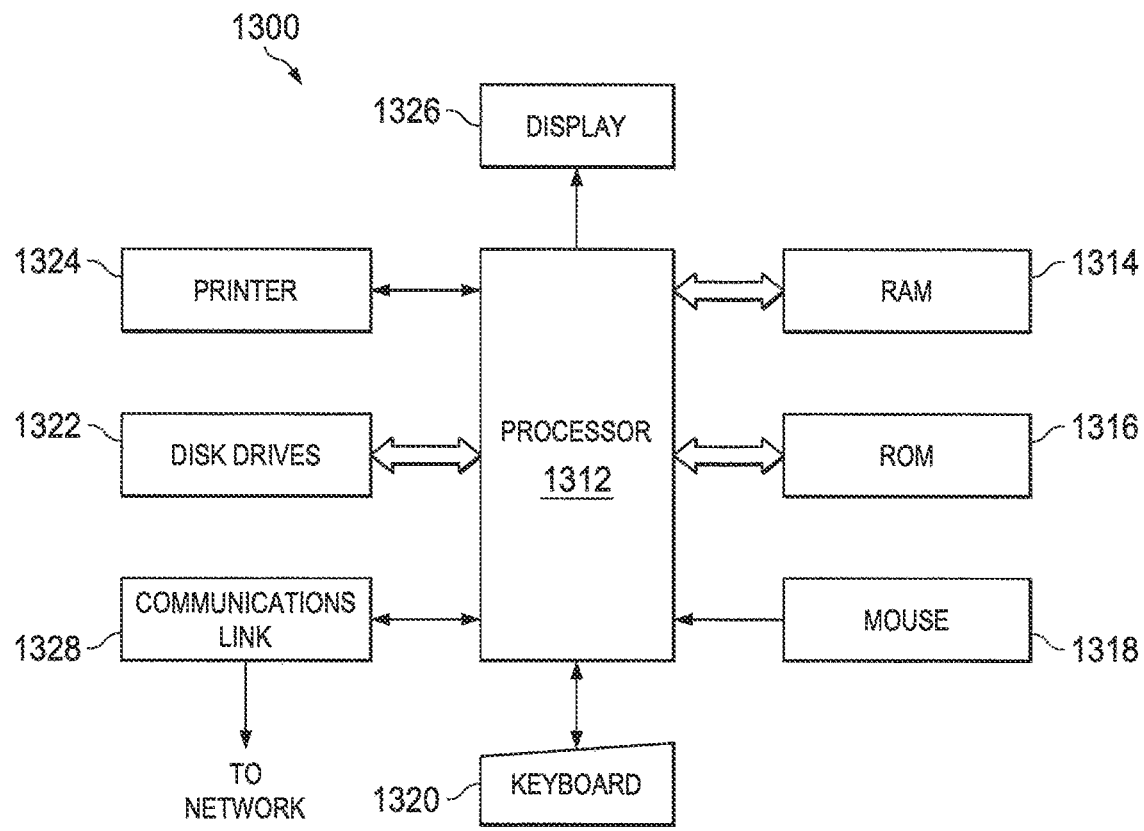
FIG. 13 illustrates an example computing device for dynamically binding supplemental content according to this disclosure.
Figure 10:
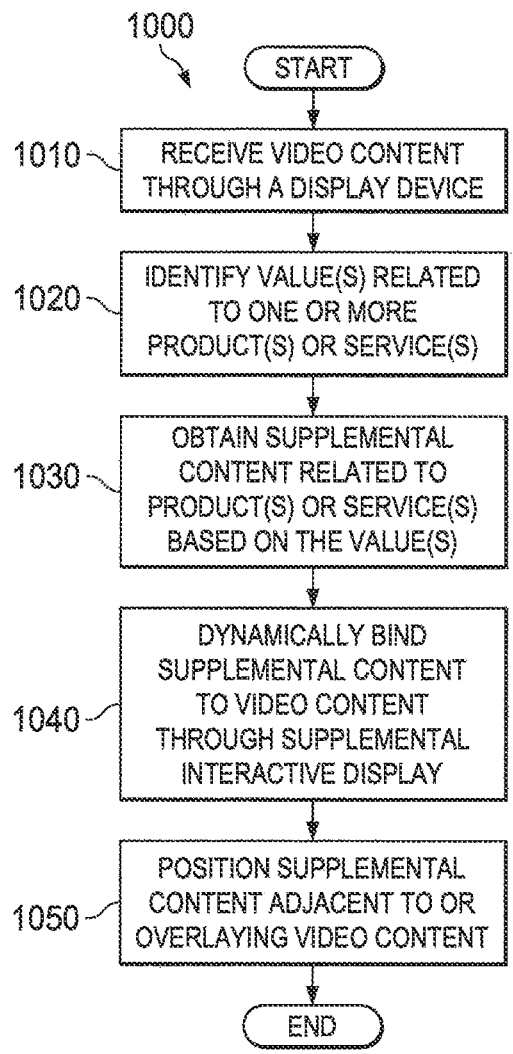
FIG. 10 illustrates an example process for dynamically binding supplemental content to video content according to this disclosure.

FIG. 10 illustrates an example process 1000 for dynamically binding supplemental content to video content according to this disclosure. The process 1000 may, for example, be performed by at least one processing device 1312 as shown in FIG. 13 and described below. In the following description, the at least one processing device 1312 is referred to as a controller, although the process 1000 could be performed by any other suitable device.

At step 1010, the controller receives video content at a display device. The video content could represent any suitable type of video content. Also, the video content could be received from any suitable source, such as a video service that provides video content (like YOUTUBE, TWITTER, VINE, or the like).

At step 1020, the controller identifies at least one value related to one or more products or services. The at least one value is associated with the video content. This could be done in any suitable manner, such as by locally or remotely identifying characteristics of the media, such as its fingerprint, title, size, and the like. The value can also be provided through a data file, such as but not limited to an XML file. The value can also be retrieved by data mining Internet information associated with the video content. For instance, the value could be found by identifying a website providing values for the video content.

At step 1030, the controller obtains supplemental content related to the one or more products or services based on the at least one value. The supplemental content provides additional information about the one or more products or services. For example, the additional information could be pricing, descriptions, reviews, or the like about the one or more products or services. The supplemental information can also include controls related to the one or more products or services, the additional information, and configurations related to the one or more products or services. In some embodiments, controls could be interactions available with the one or more products or services. Additionally, user parameters may be sent with the values to help identify supplemental content to send to the user.

At step 1040, the controller dynamically binds the supplemental content to the video content through a supplemental interactive display. The supplemental interactive display can override the controls of the display previously displaying the video. At step 1050, the controller positions the supplemental content in association with the video content, such as adjacent to or overlaying the video content. At this point, the process 1000 terminates.

Figure 11:
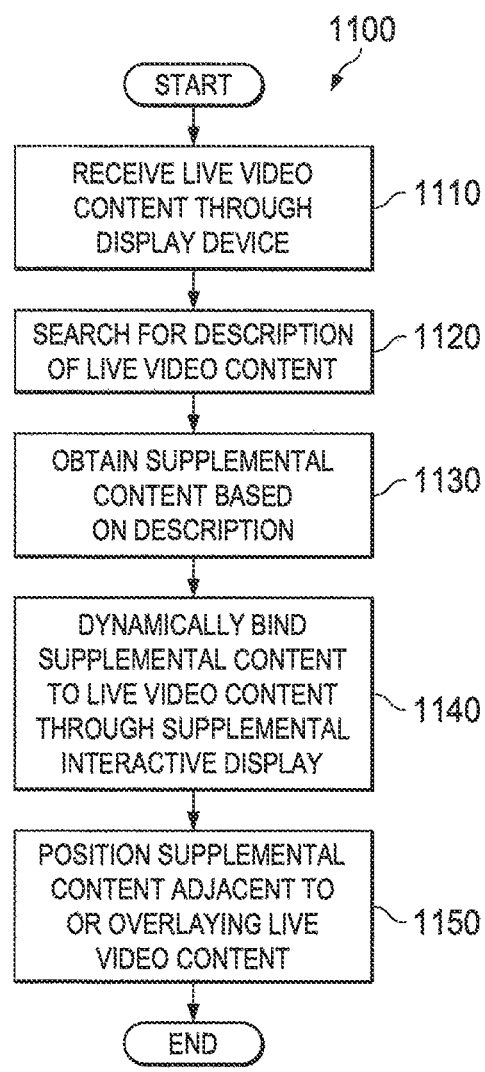
FIG. 11 illustrates an example process for dynamically binding supplemental content to live video content according to this disclosure.

FIG. 11 illustrates an example process 1100 for dynamically binding supplemental content to live video content according to this disclosure. The process 1100 may, for example, be performed by the at least one processing device 1312 as shown in FIG. 13 and described below. Again, in the following description, the at least one processing device 1312 is referred to as a controller, although the process 1100 could be performed by any other suitable device.

At step 1110, the controller receives live video content through a device. Live video content represents real-time video content, such as video content that is being filmed at or near real-time by an endpoint. At step 1120, the controller searches for a description of the live video content. In some embodiments, the description may be in a programming directory, within a broadcast feed, searched for on the Internet, or the like.

At step 1130, the controller obtains supplemental content based on the description. The supplemental content provides additional information about one or more products or services related to the live video content. The supplemental content can be obtained from a supplemental content server. At step 1140, the controller dynamically binds the supplemental content to the live video content through a supplemental interactive display. The supplemental interactive display can override the controls of the display previously displaying the video. At step 1150, the controller positions the supplemental content in association with the video content, such as adjacent to or overlaying the video content. At this point, the process 1100 terminates.

FIG. 12 illustrates an example process 1200 for dynamically binding supplemental content to a content transactional item according to this disclosure. The process 1200 may, for example, be performed by the at least one processing device 1312 as shown in FIG. 13 and described below. Once again, in the following description, the at least one processing device 1312 is referred to as a controller, although the process 1200 could be performed by any other suitable device.

At step 1210, the controller identifies a content transactional item through a device. A "content transactional item" represents a product or service available for purchase, lease, rental, or other transaction. In an example embodiment, a content transactional item could be a physical product or service, such as a book at a store. In another example, the content transactional item could be a product or service in a media stream or base content. Identifying the content transactional item could be done in any suitable manner, such as by capturing an image of an item and then sending that image or information related to that image to a server with a repository of images.

At step 1220, the controller identifies a description related to the content transactional item. Location information, such as a name of a store, geographical information, global positioning information, or the like, may also be obtained. The transactional item could further be identified by an RFID tag, a signal with information about the product, or a barcode.

At step 1230, the controller obtains supplemental content related to the content transactional item based on the description. The supplemental content provides additional information about the content transactional item. The supplemental content may include information related to the item, current discounts, user discounts, or the like. At step 1240, the controller dynamically binds the supplemental content to the content transactional item through a supplemental interactive display. The supplemental content can be displayed as one or more services or products related to the content transactional item. At step 1250, the controller positions the supplemental content in association with the video content, such as adjacent to or overlaying the video content. At this point, the process 1200 terminates.

FIG. 13 illustrates an example computing device 1300 for dynamically binding supplemental content according to this disclosure. The computing device 1300 here could be used to implement any of the techniques or functions described above, including any combination of the techniques or functions described above. The computing device 1300 may generally be adapted to execute any of suitable operating system, including WINDOWS, MAC OS, UNIX, LINUX, OS2, IOS, ANDROID, or other operating systems.

As shown in FIG. 13, the computing device 1300 includes at least one processing device 1312, a random access memory (RAM) 1314, a read only memory (ROM) 1316, a mouse 1318, a keyboard 1320, and input/output devices such as a disc drive 1322, a printer 1324, a display 1326, and a communication link 1328. In other embodiments, the computing device 1300 may include more, less, or other components. Computing devices come in a wide variety of configurations, and FIG. 13 does not limit the scope of this disclosure to any particular computing device or type of computing device.

Program code may be stored in the RAM 1314, the ROM 1316 or the disc drive 1322 and may be executed by the at least one processing device 1312 in order to carry out the functions described above. The at least one processing device 1312 can be any type(s) of processing device(s), such as one or more processors, microprocessors, controllers, microcontrollers, multi-core processors, and the like. The communication link 1328 may be connected to a computer network or a variety of other communicative platforms, including any of the various types of communication networks 140 described above. The disc drive 1322 may include a variety of types of storage media such as, for example, floppy drives, hard drives, CD drives, DVD drives, magnetic tape drives, or other suitable storage media. One or multiple disc drive 1322 may be used in the computing device 1300.

Note that while FIG. 13 provides one example embodiment of a computer that may be utilized with other embodiments of this disclosure, such other embodiments may utilize any suitable general-purpose or specific-purpose computing devices. Multiple computing devices having any suitable arrangement could also be used. Commonly, multiple computing devices are networked through the Internet and/or in a client-server network. However, this disclosure may use any suitable combination and arrangement of computing devices, including those in separate computer networks linked together by a private or public network.

The computing devices 1300 could represent fixed or mobile devices, and various components can be added or omitted based on the particular implementation of a computing device. For example, mobile devices could include features such as cameras, camcorders, GPS features, and antennas for wireless communications. Particular examples of such mobile devices include IPHONE, IPAD, and ANDROID-based devices.

Although the figures above have described various systems, devices, and methods related to the dynamic binding of base content to supplemental content, various changes may be made to the figures. For example, the designs of various devices and systems could vary as needed or desired, such as when components of a device or system are combined, further subdivided, rearranged, or omitted and additional components are added. As another example, while various methods are shown as a series of steps, various steps in each method could overlap, occur in parallel, occur in a different order, or occur any number of times. In addition, examples of graphical presentations are for illustration only, and content can be presented in any other suitable manner. It will be understood that well-known processes have not been described in detail and have been omitted for brevity. Although specific steps, structures, and materials may have been described, this disclosure may not be limited to these specifics, and others may be substituted as it is well understood by those skilled in the art, and various steps may not necessarily be performed in the sequences shown.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Other changes, substitutions, and alterations are also possible without departing from the invention as defined by the following claims.

What is claimed is:

1. A processor-implemented method, comprising:
   capturing, at a first mobile compute device, information displayed on a television, the first mobile device in communication with one or more servers;
   sending the information and at least one of a user parameter or a geolocation parameter to at least one of the one or more servers;
   receiving, at the first mobile device and from at least one of the one or more servers, video content corresponding at least in part with television media displayed on the television;
   determining a value associated with at least one of the video content or the information, the value associated with at least one of a product or a service;
   receiving supplemental content in response to a request to play the video content and based on the value and the at least one of the user parameter or the geolocation parameter, the supplemental content providing additional information about the at least one of the product or the service; and
   dynamically binding the supplemental content to the video content based on the request to play the video content to form a shareable container, the shareable container including code for a video player window configured to display the video content, the shareable container allowing sharing of the bound video content and supplemental content to a second mobile computer device.

2. The method of claim 1, further comprising:
   displaying, at the first mobile device, the video content substantially synchronously as the television media content being displayed on the television.

3. The method of claim 1, further comprising:
displaying, at the first mobile device and in response to the request to play the video content, the video content substantially synchronously as the television media content being displayed on the television.

4. The method of claim 1, further comprising sharing the sharable container to the second mobile device.

5. The method of claim 1, further comprising sharing the sharable container to the second mobile device such that the supplemental content and the video content are displayed at the second mobile device substantially synchronously as the television media content being displayed on the television.

6. The method of claim 1, wherein the value identifies the at least one of the product or the service based on an item appearing in a scene of at least one of video content or the television media.

7. The method of claim 1, further comprising displaying, at the first mobile device, the video content and the supplemental content.

8. The method of claim 1, further comprising displaying, at the first mobile device, the video content and the supplemental content, the supplemental content positioned such that the supplemental content overrides a control of display of the video content.

9. The method of claim 1, wherein:
the information is displayed on the television is associated with a portion of the television media that is associated with a first time of broadcasting the television media; and
the video content includes a second portion of the television media different from the first portion of television media, the second portion being associated with a second time of broadcasting the television media, the second time being earlier than the first time.

10. The method of claim 1, wherein the television media is a live broadcast.

11. A non-transitory, computer readable medium storing code, the code comprising instructions to, when executed, cause a processor to:
receive, information captured by a first mobile device that was displayed on a television and at least one of a user parameter or a geolocation parameter;
send, to the first mobile device video content corresponding at least in part with television media displayed on the television;
receive, from the first mobile device, a value associated with at least one of the video content or the information, the value associated with at least one of a product or a service;
identifying supplemental content in response to receiving the value and based on the value and the at least one of the user parameter or the geolocation parameter, the supplemental content providing additional information about the at least one of the product or the service;
dynamically bind the supplemental content to the video content to form a shareable container, the shareable container including code for a video player window configured to display the video content, the shareable container allowing sharing of the bound video content and supplemental content; and
send the sharable container to the first mobile device in response to a request to play the video content.

12. The non-transitory, processor-readable medium of claim 11, the code further comprising code to cause the processor to:
identify the television media based on the information; and
select the video content in response to identifying the television media.

13. The non-transitory, processor-readable medium of claim 11, the code further comprising code to cause the processor to:
identify a fingerprint of the television media based on the information;
identify the television media based on the fingerprint; and
select the video content in response to identifying the television media.

14. The non-transitory, processor-readable medium of claim 11, the code further comprising code to cause the processor to search a data source for a description of the television media in response to receiving the information.

15. The non-transitory, processor-readable medium of claim 11, the code further comprising code to cause the processor to search a data source for a description of the television media in response to receiving the information, the supplemental content being identified based on the description.

16. The non-transitory, processor-readable medium of claim 11, wherein:
the information is associated with a portion of the television media displayed on the television at a first time of broadcasting the television media; and
the video content includes a second portion of the television media different from the first portion of television media, the second portion being associated with a second time of broadcasting the television media, the second time being earlier than the first time.

17. The non-transitory, processor-readable medium of claim 11, the code further comprising code to cause the processor to identify a statistical parameter of a plurality of users that includes the user based on the user parameter, the supplemental content identified based on the statistical parameter.

18. The non-transitory, processor-readable medium of claim 11, the code further comprising code to cause the processor to send the sharable container to a second mobile device.

19. The non-transitory, processor-readable medium of claim 11, wherein the code to cause the processor to dynamically bind the supplemental content to the video content includes code to cause the processor to position the supplemental content such that it overlays at least a portion of the video content and overrides a control of display of the video content.

20. A non-transitory, computer readable medium storing code, the code comprising instructions to, when executed, cause a processor to:
capture, at a first mobile compute device, information displayed on a television, the first mobile device in communication with one or more servers;
send the information and at least one of a user parameter or a geolocation parameter to at least one of the one or more servers;
receiving, at the first mobile device and from at least one of the one or more servers, video content corresponding at least in part with television media displayed on the television;
determining a value associated with at least one of the video content or the information, the value associated with at least one of a product or a service;
receiving supplemental content-in response to a request to play the video content and based on the value and the at least one of the user parameter or the geolocation parameter, the supplemental content providing additional information about the at least one of the product or the service; and dynamically binding the supplemental content to the video content based on the request to play the video content to form a shareable container, the shareable container including code for a video player window configured to display the video content, the shareable container allowing sharing of the bound video content and supplemental content to a second mobile computer device.

* * * * *